United States Patent [19]

Bigland

[11] 3,930,782
[45] Jan. 6, 1976

[54] APPARATUS FOR EXTRUDING PLASTIC MATERIAL

[75] Inventor: Bernard Keith Bigland, Radcliffe, England

[73] Assignee: The General Engineering Co. (Radcliffe) Limited, Radcliffe, Great Britain

[22] Filed: Apr. 10, 1974

[21] Appl. No.: 459,794

[30] Foreign Application Priority Data
Apr. 11, 1973  United Kingdom............... 17490/73

[52] U.S. Cl................................. 425/376; 425/461
[51] Int. Cl.² ........................................... B29F 3/06
[58] Field of Search .......... 425/146, 205, 376, 161, 425/168, 461

[56] References Cited
UNITED STATES PATENTS

| | | | |
|---|---|---|---|
| 2,680,880 | 6/1954 | Corbett | 425/197 X |
| 2,767,437 | 10/1956 | Marshall | 425/197 X |
| 3,078,513 | 2/1963 | Levinson et al. | 425/146 |
| 3,110,930 | 11/1963 | Beck | 425/146 |
| 3,499,186 | 3/1970 | Sassa | 425/204 X |
| 3,649,147 | 3/1972 | Fritsch | 425/376 X |

*Primary Examiner*—Richard B. Lazarus
*Attorney, Agent, or Firm*—James E. Nilles

[57] ABSTRACT

Apparatus for extruding plastic materials through a die and including a screw extruder in which compounding is to be carried out, a feed means for the compounded material, and a positive displacement delivery means through which compounded materials can be passed to said die, said positive displacement delivery means serving to meter the compounded materials and generate the required extrusion pressure at the die head.

10 Claims, 8 Drawing Figures

3,930,782

APPARATUS FOR EXTRUDING PLASTIC MATERIAL

BACKGROUND OF THE INVENTION

This invention concerns the extrusion of plastics materials. The term 'plastics materials' as used in this specification is to be construed as including within its scope elastomeric materials such as natural and synthetic rubbers, as well as thermoplastic materials such as polyvinyl chloride, polyethylene, polypropylene and the like.

It is generally accepted that extruders for plastics materials have three main functions to perform namely compounding, which is the mixing of a plastics material, which usually enters the extruder in particulate or granular condition, to produce a homogeneous softened or plastics state extrudable mass; metering, which is the controlling of the output through an extrusion die and which ideally should be for all practical purposes constant; and pressurising which is the generating of sufficient pressure whilst compounding is being carried out to force the softened homogeneous mass through the extrusion die.

Clearly the compounding, metering and pressurizising of the plastics material must be carried out in an extruder which will give a through-put rate which is economically feasible.

Since the properties of plastics materials differ considerably depending upon their chemical and molecular composition there should ideally be an extruder for every different material to be extruded and also there should be a different die head for each of these materials but of course this is not practical economically and thus all extruders are designed in an attempt to reach the best possible compromise so that they can be used to extrude a range of different materials, additionally die head design is also a compromise.

It should also be borne in mind that even if an extruder were always to be used for extruding the same material whose chemical and molecular structure is carefully controlled it is not possible to design the extruder to meet all of the operating conditions ideally. For example, if compounding, metering and pressure creation were achieved to a high degree of accuracy the likelihood is that the residence time of the material in the extruder screw barrel will be uneconomically lengthy or, of course, the extruder size will be undesirably large.

Alternatively whilst it is possible to provide for very high output rates it may, for example, result that the compounding capabilities of the extruder are such that an inferior quality compound will result.

In the case in which the extruder were designed to give very high operating pressures the mechanism would be required to have bearings for the extruder screw which were either very expensive in order to give a long useful life, or are less expensive but suffer from having only a short useful life and thus require a frequent replacement.

Metering per se presents special problems of extruder screw design which if met to give optimum metering capability may well result in the extruder not being acceptably efficient with regard to one or more of the other requirements.

The difficulties briefly outlined above serve to illustrate some of the problems facing the designer of extruders and to illustrate the need for the designer always to decide upon a compromise which will result in the production of a screw extruder which is acceptable. These difficulties are applicable to all types of screw extruders to varying degrees. For example, there are three main types of screw extruder namely the single screw extruder in which a single screw is contained within a single barrel; the multi-screw extruder which comprises two or more intermeshing screws in a single barrel, and the compound extruder which may comprise a number of single or multi-screw extruders which collectively feed a single die or in which the outlet from one extruder feeds the inlet of the next. For simplicity these types of extruder will be referred to in this specification simply as 'screw extruders' unless the context requires otherwise for clarity.

SUMMARY OF THE PRESENT INVENTION

The present invention is based upon the appreciation that a more acceptable mechanism than has hitherto been the case can be achieved by carrying out the compounding in machinery not required to control metering or pressure generation at the die head.

The object of the present invention therefore is to provide an apparatus which will meet the requirements of known screw extruders in a more efficient manner.

Thus according to the present invention an apparatus for extruding plastics materials through a die includes a screw extruder in which compounding is to be carried out, a feed means for the compounded material, and a positive displacement delivery means through which compounded materials can be passed to said die, said positive displacement delivery means serving, in use, to meter the compounded materials and generate the required extrusion pressure at the die head.

Conveniently the positive displacement delivery means is a gear pump.

The screw extruder may incorporate a single screw, multi screw, or compound screw.

There may also be provided a pressure sensing means adapted to control extruder speed and thus maintain a pre-determined pressure at the inlet to the positive displacement delivery means, said sensing means being located in the extruder adjacent its outlet; in a feed pipe from the extruders or at the inlet to the positive displacement delivery means.

BRIEF DESCRIPTION OF THE DRAWINGS

The invention will now be described further, by way of example only, with reference to several practical forms thereof and with reference to the accompanying schematic drawings in which.

DESCRIPTION OF A PREFERRED EMBODIMENT

Figure 1:
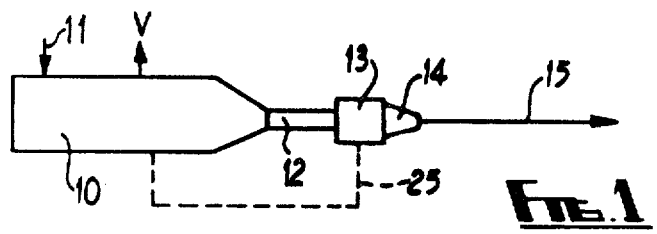
FIG. 1. shows a simple extruder arrangement from which a single extrusion can be produced.

In the accompanying drawings like parts are given like reference numerals.

In the arrangement shown in FIG. 1. there is provided a single screw extruder 10 in which a mass of material, fed to an inlet at 11 in the form of granules or small pieces, is compounded to produce a homogeneous softened or plastic state extrudable mass. As the outlet end of the extruder is provided a feed pipe 12 which leads to the inlet side of a gear pump 13 having at its outlet side a die 14 from which issues a formed extrusion 15.

Figure 4:
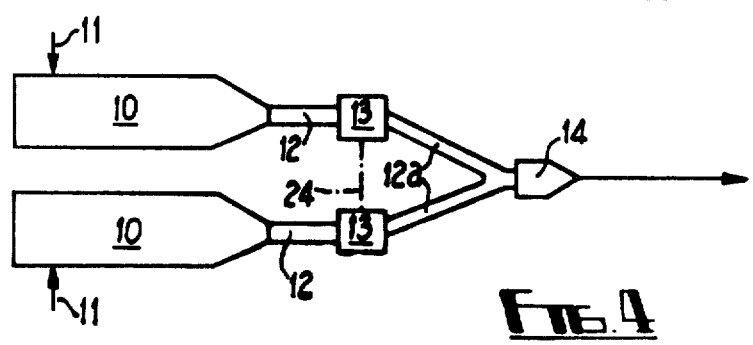
FIGS. 4 to 8 illustrate still further modifications.

It is possible as shown in FIG. 4. to provide two extruders 10 each having a feed pipe 12 and gear pump 13. In this case there will be outlet pipes 12a from each gear pump 13, arranged to feed a single die head 14. This allows for the feeding of two different materials to the die head 14, the materials being capable of being fed at the same or different rates.

Figure 2:
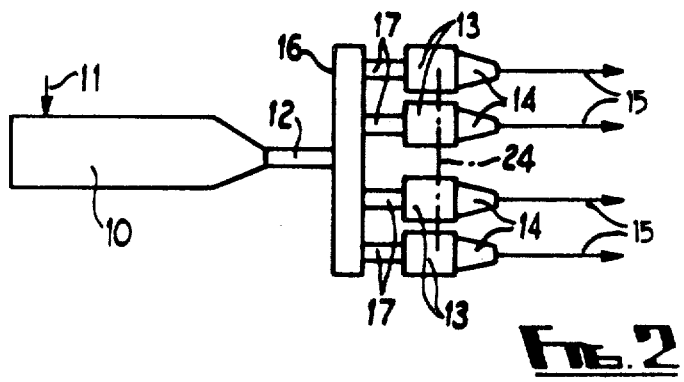
FIG. 2. is a modification showning an extruder arrangement from which several extrusions can be produced simultaneously.

As shown in FIG. 2. there is again provided a single screw extruder 10 with an inlet 11 at or near one end and a feed pipe 12 at its other end. In this case, however, the feed pipe 12 feeds a manifold 16 from which, for example, four subsidiary feed pipes 17 lead to a group of four gear pumps 13 each having a die 14 in which an extrusion 15 is formed.

Figure 3:
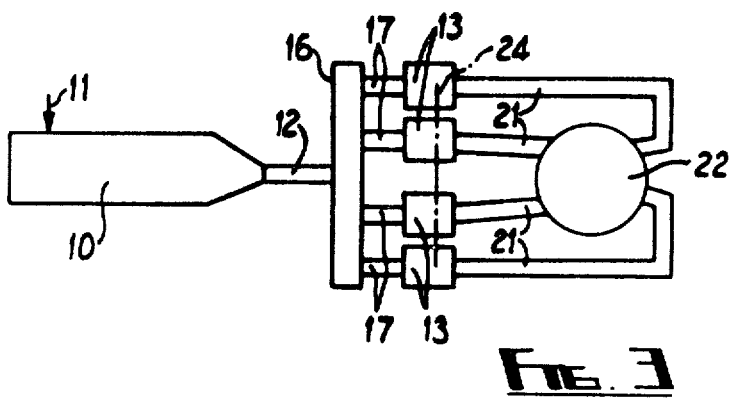
FIG. 3. shows a further modification from which a tubular extrusion can be produced.

In the arrangement of FIG. 3. there is provided a single extruder 10 with inlet 11 and feed pipe 12 leading to a manifold 16 from which subsidiary feed pipes 17 lead each to a gear pump 13. In this case, however, the gear pumps 13 are provided with outlet conduits 21 which feed to different peripheral locations of a single die 22 by which can be produced, for example a tubular film extrusion.

Figure 7:
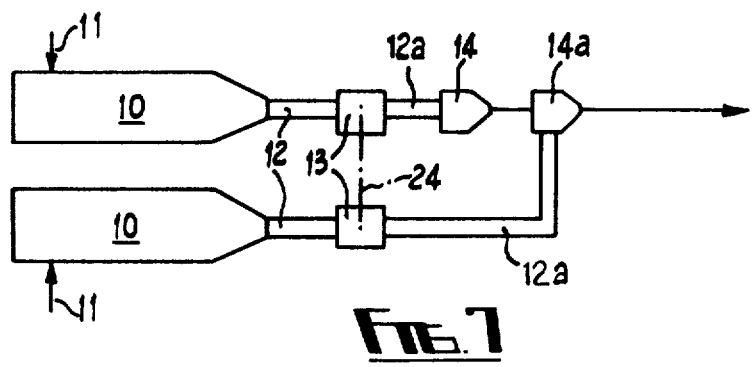
Figure 8:
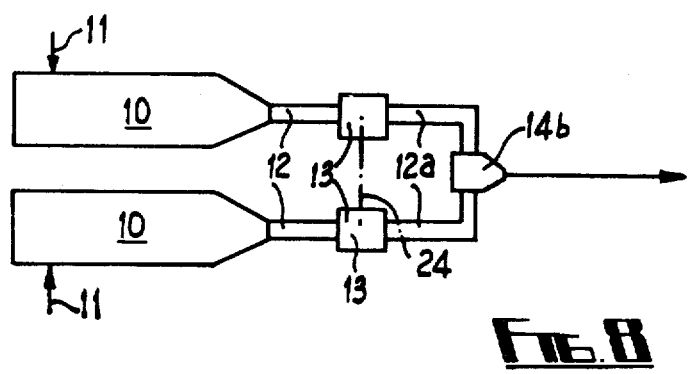

Whilst the description above relating to FIGS. 1, 2 and 3 makes reference throughout to the use of a single screw extruder it should be borne in mind that in each case a multi-screw extruder may be used or in fact a compound extruder comprising single screws or multi-screws can be used. Additionally whilst gear pumps have been referred to these may be replaced by any other form of positive displacement mechanism such as intermeshing positive displacement multi-screw pumps. The three examples described with reference to FIGS. 1 to 3 are examples only of many forms of mechanism. For example the arrangements of FIGS. 2, 3 or 4 may be modified by providing a multi-layer die or, as shown in FIG. 7. by providing two separate die heads 14 and 14a so that successive coatings can be extruded one on top of the other. In the apparatus shown there are two extruders 10 each feeding its own gear pump 13 via lines 12, subsidiary feed lines 12a feed the dies 14, 14a and in this case coatings of different materials can be extruded. If two or more coatings of the same material are required then only one extruder is necessary and this latter would feed all of the gear pumps via a manifold and subsidiary feed lines, one to each gear pump. If it is desired to coat part only of the periphery of the element being coated with a material from each gear pump 13 this can be achieved using a single multi-part die 14b fed from two or more gear pumps 13 and two or more extruders 10 are used. In this case, for example, multi-colored coatings can be applied. FIG. 8. illustrates an apparatus that can be used for this purpose.

Figure 5:
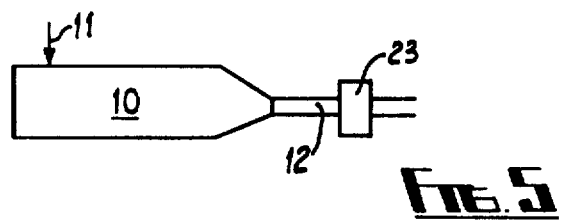
Figure 6:
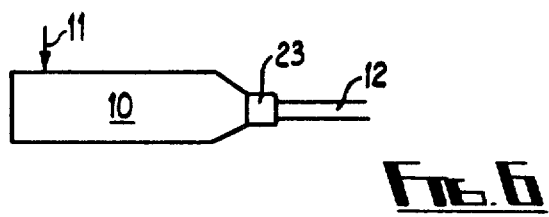

In a further, modification, shown in FIGS. 5 and 6 applicable to all of the arrangements illustrated and referred to above a pressure sensing device 23 may be incorporated into the feed pipe 12, as shown in FIG. 5, or the outlet region of the barrel of the extruder 10, as shown in FIG. 6. The pressure sensing device 23 serves to feed back a signal to the extruder drive control the speed of the screw and thus control and maintain constant the pressure of the material. By virtue of providing the pressure sensing means referred to it is possible, independent of the die head pressure requirements, to obtain substantially constant compounding. Additionally by providing a means for sensing and thus keeping constant the pressure it is possible to maintain a relatively low pressure and thus use, when required, rotary seals of simple construction between the supply pipe and the pump or manifold.

A further advantage stems from operating the screw extruder at low pressure and this lies in the fact that small, low cost, bearings can be used for the screw or screws and at the same time long operational life is achieved in the bearings. The use of small bearings is advantageous in the case in which multi-screw extruders or compound extruders are to be used since the size of the apparatus can be relatively small whilst maintaining reliability.

In so far as the die head resistance is concerned is has always been the case, with known apparatus in which the die head is attached directly to the output end of the screw extruder, that this is high when using small dies and desirable when larger dies are used if a high quality produce is to be produced and if good distribution of material around the die is to be achieved.

It is also known that all materials to be extruded have a temperature in which they can be worked and often it is necessary to cool the materials after extrusion. Bearing this in mind efforts have been made to work the material at a temperature which is as near as possible to the lowest temperature at which extrusion can be carried out. Clearly with a high die head resistance the output temperature of the material is somewhat higher than is desirable due to the heating effect of viscous friction in the material as it passed through the screw and die head. To combat this problem either the extruder has been run at output rates lower than that which could be achieved, or alternatively the die head has been designed to give a lower resistance to the passage of the material therethrough than is required for optimum performance. This results in loss of uniformity of distribution of the material over the whole of the die head aperture or alternatively to the risk of degradation of the material.

When high die head pressures are present with the resultant high temperature of the material issuing therefrom it has been necessary to use relatively expensive cooling systems to cool the product after extrusion.

As a result of the present invention the extruder can now be run at a lower pressure and thus the material issues from the extruder into the feed pipe at a temperature which is nearer to the lowest possible working temperature than was hitherto possible. Thus even though the die head pressure may be high and the temperature of the material is raised, in the die head, the product issuing from the die is at a lower temperature than has hitherto been the case and thus cooling problems are somewhat reduced.

The invention is also applicable to the case in which the extruder is provided with venting means (indicated at V in FIG. 1.) and applicable to the extruder of all of the apparatuses illustrated, whereby undesirable gases or liquids in the mass are to be extracted or alternatively where gas or liquid is to be introduced in controlled quantity to produce a cellular mass.

The requirements of such an extruder is that over part of the length of the screw the space between adjacent flights is to be only partially filled with the plastics material to be extruded so that a separation zone for the plastics material and gas or liquid is created or alternatively a gas or liquid can be introduced into the free space between adjacent flights for absorption into the plastics material. In such an extruder the outlet region must be filled with plastics material to ensure that the output is consistant.

Extruders provided with venting means are known but are expensive and difficult to operate. By using the positive displacement delivery means 13 of this invention with the extruder and providing a means, either in the feed pipe or extruder, for controlling the pressure of the mass being fed from the screw, optimum operation conditions can be achieved more economically than has hitherto been possible.

Refinements to the apparatus described above may be made. For example, the gear pumps 13 of FIGS. 2, 3, 4, 7 and 8 can be geared together as indicated by the chain lines 24 on the drawings to ensure that they each deliver pre-determined proportions of the output. Additionally in the arrangement of FIG. 4. for example, there may be more than two extruders 10 and two gear pumps 13 to supply material to a single die head 14. This arrangement allows for the delivery of more than two different materials in a pre-determined proportions to the die head 14.

It is also possible to gear together the extruder or extruders and the gear pump or pumps, and in this case there is no necessity to provide a pressure sensing means 23. Whilst such gearing is illustrated in broken line at 25 in FIG. 1. only it can be applied to the arrangement of any one of the apparatuses illustrated.

I claim:

1. An apparatus for extruding plastic materials comprising a screw extruder in which said plastic mterials are plasticized, drive means for the screw extruder, a feed means for supplying plastic materials to said screw extruder, an extruder die for shaping said plasticized material, positive displacement delivery means disposed between said screw extruder and said extruder die for receiving plasticized material from said extruder and for conveying plasticized materials to said die, and gear means operably connected between said positive displacement delivery means and said drive means whereby said delivery means and drive means are geared together for regulating the flow of plasticized material from said delivery means in response to flow from said screw extruder.

2. An apparatus as claimed in claim 1 in which the positive displacement delivery means is a gear pump.

3. An apparatus as claimed in claim 1 in which the positive displacement delivery means is an intermeshing positive displacement multi-screw pump.

4. An apparatus as claimed in claim 1 in which there are a plurality of positive displacement delivery means connected to the outlet of an extruder, each of said positive displacement delivery means being connected to its own die head.

5. An apparatus as claimed in claim 1 in which there are a plurality of positive displacement delivery means, each connected to an extruder and each connected to a common die head.

6. An apparatus as claimed in claim 4 in which the positive displacement delivery means are geared together.

7. An apparatus as claimed in claim 5 in which the positive displacement delivery means are geared together and each positive displacement delivery means is geared to an extruder.

8. An apparatus for extruding plastic materials comprising plasticizing means including a least one screw extruder in which said plastic materials are plasticized, drive means for said plasticizing means, a feed means for supplying plastic materials to said plasticizing means, at least one extruder die for shaping said plasticized material, a plurality of positive displacement delivery means, each of said positive displacement delivery means disposed between a screw extruder and a die and receiving plasticized material from said extruder and for conveying plasticized materials to said die under pressure and at a uniform rate of flow, and gear means operably connected between each of said positive displacement delivery means for controlling the pressure and rate of flow of plasticized material from each of said positive displacement delivery means with respect to the others.

9. The extruding apparatus set forth in claim 8 wherein said positive displacement delivery means are gear pumps.

10. The extruding apparatus set forth in claim 8 wherein said plasticizing means includes a plurality of screw extruders and said delivery means are connected to a separate screw extruder and wherein said delivery means are connected to the same extruder die.

* * * * *